Patented Feb. 22, 1927.

1,618,960

UNITED STATES PATENT OFFICE.

DIRK COSTER, OF HAARLEM, NETHERLANDS, AND GEORG VON HEVESY, OF COPENHAGEN, DENMARK, ASSIGNORS TO NAAMLOOZE VENNOOTSCHAP PHILIPS' GLOEILAMPENFABRIEKEN, OF EINDHOVEN.

PROCESS OF SEPARATING ZIRCONIUM AND HAFNIUM.

No Drawing. Application filed March 13, 1924, Serial No. 699,145, and in the Netherlands April 26, 1923.

This invention relates to the separation of the element, the atomic number of which is 72, named hafnium from zirconium, said elements being frequently found side by side in minerals and having chemical properties which strongly resemble each other.

According to this invention the separation of the said elements is brought about by starting from a solution of the double fluorides of hafnium and zirconium or from the corresponding acids.

Double fluorids will be understood hereinafter to be compounds of the chemical formula $nXFl,ZrFl_4$ and $nXFl,HfFl_4$ for example $X_2ZrFl_6$ and $X_2HfFl_6$, in which X=a metal such as potassium and Hf= hafnium. The corresponding acids should be understood to be the acids $H_2ZrFl_6$ and $H_2HfFl_6$ or generally $nHFl,ZrFl_4$ and $nHFl,HfFl_4$.

The separation from the solution of the double fluorides or of the corresponding acids can be effected according to the invention by fractional crystallization in the presence of hydro-fluoric acid and preferably also in the presence of an excess of the cation, the latter being obtained by adding a suitable quantity of a soluble salt in which the metal (X) is the same as that of the double-fluorides of Hf and Zr.

Good results are obtained by starting from a solution of alkaline double fluorides, for example the potassium double fluorides.

It is advisable to purify the solution of the double-fluorides from any other metals contained therein, prior to the fractional crystallization.

In order to obtain the solution of double fluorides or of the corresponding acids from the zirconium minerals which contain hafnium, various methods may be adopted.

A suitable quantity of potassium bifluoride (KFl—HFl) may be added to a mineral such as for example the commercially obtainable oxide of zirconium, and then the two substances may be fused; thus producing the potassium double fluorides of hafnium and zirconium. ($K_2ZrFl_6$ and $K_2HfFl_6$.)

Another method is first to dissolve the mineral in hydrofluoric acid and subsequently to add the necessary quantity of potassium bifluoride.

According to a third process the primary substance may be fused with some suitable medium and then (by adding a fluoride, a bifluoride or hydrofluoric acid) the compounds may be converted into the desired double fluorides or acids.

An example of applying the process according to the invention will be described more fully hereinafter.

The mineral, for example alvite, is fused with a triple quantity of potassium bifluoride so that the potassium double fluorides of hafnium and zirconium are produced.

The product thus obtained is dissolved in a boiling aqueous solution containing 10% of hydrofluoric acid and 5% of potassium fluoride. Thus only compounds of Zr and Hf and, if present, of titanium, niobium, tantalum, and the like are brought into solution, but other impurities remain behind.

The solution obtained is filtered and cooled down, which causes the crystallization of the principal mass.

As the double fluoride of hafnium is more easily soluble than the double fluoride of zirconium, the crystallized mass contains a materially smaller quantity of hafnium than the primary solution.

The mother liquor on the contrary contains a considerably greater quantity of hafnium than the primary solution and the zirconium can be entirely removed from it by repeated crystallization in the same manner, so that practically only the double fluoride of hafnium is left in solution.

The admixtures of titanium, niobium, tantalum and the like can be removed in any known manner from the solution obtained, so that finally a substantially pure solution of potassium-hafnium-fluoride is left. Preferably however this removal occurs before proceeding to crystallization.

The said solution is evaporated to dryness, after which the double fluoride of hafnium may be converted into any other compound of hafnium or into the metal, for example in the manner known for zirconium. Metallic hafnium may be obtained as follows: An excess of a base is added to a solution of the double-fluoride of hafnium obtained, so that the hydroxide of hafnium is precipitated. The hydroxide is converted into the oxide by heating and reducing the same in any suitable manner known for reducing zirconium-oxide by which metallic hafnium is obtained.

The hafnium can in a similar manner, be entirely removed from the mass of crystals by dissolving the crystals obtained in a fresh solution of hydrofluoric acid, causing it to crystallize again, and repeating the crystallization until the hafnium has been entirely extracted. There finally remains a mass of crystals from which substantially pure zirconium may be obtained.

In the claims, by the term "a high percentage" it is intended to cover also a percentage of 100. Also by the term "double fluorides" it is intended to cover the corresponding acids.

What we claim is:—

1. A process of separating hafnium and zirconium characterized by starting from a solution of the double fluorides of hafnium and zirconium.

2. A process according to claim 1 characterized by starting from a solution of the alkaline double fluorides of hafnium or zirconium.

3. The method of separating hafnium and zirconium, comprising the steps of converting compounds of these elements into double fluorides.

4. The method of separating hafnium and zirconium, comprising the steps of converting compounds of these elements into alkali double fluorides.

5. A process of separating hafnium and zirconium characterized by starting from a solution of the double fluorides of hafnium and zirconium and separating the salts by fractional crystallization.

6. A process according to claim 1 characterized by starting from a solution of the alkaline double fluorides of hafnium or zirconium and separating the salts by fractional crystallization.

7. The method of separating hafnium and zirconium comprising the steps of fusing minerals containing compounds of these elements with a flux, then adding fluorine compounds to the resulting mass, and forming double fluorides of hafnium and zirconium.

8. The method of separating hafnium and zirconium, comprising the steps of fusing minerals containing compounds of these elements with a fluorine compound thus forming double fluorides of hafnium and zirconium.

9. The method of separating hafnium and zirconium, which comprises converting compounds of these elements into solutions of crystallizable salts, and then fractionally separating the salts by fractional crystallization.

10. The method of separating hafnium and zirconium, which comprises converting compounds of these elements into double fluorides, and separating the salts by fractional crystallization.

11. The method of separating hafnium and zirconium, which comprises converting compounds of these elements into alkali double fluorides, and separating the salts by fractional crystallization.

12. The method of separating hafnium and zirconium, by starting from a solution of the double fluorides of hafnium and zirconium and separating the salts by fractional crystallization from a solution containing free hydrofluoric acid.

13. The method of separating hafnium and zirconium by starting from a solution of the alkaline double fluorides of hafnium or zirconium and separating the salts by fractional crystallization from a solution containing free hydrofluoric acid.

14. The method of separating hafnium and zirconium, which comprises converting compounds of these elements into double fluorides, and separating the salts by fractional crystallization from a solution containing free hydrofluoric acid.

15. The steps of the method of separating hafnium and zirconium, which comprises converting compounds of these elements into alkaline double fluorides and separating the salts by fractional crystallization from a solution containing free hydrofluoric acid.

16. The method of separating hafnium and zirconium, which comprises first forming soluble compounds of these elements, adding precipitating agents to separate the hafnium and zirconium from contaminating impurities present, and subsequently separating the hafnium from the zirconium by fractional crystallization.

17. The method of separating hafnium and zirconium, by starting from a solution of the double flourides of hafnium and zirconium and separating the salts by fractional crystallization from a solution containing free hydrofluoride acid and an excess of the kation of said salts.

18. The method of separating hafnium and zirconium, by starting from a solution of the alkaline double fluorides of hafnium or zirconium and separating the salts by fractional crystallization from a solution containing free hydrofluoric acid and an excess of the kation of said salts.

19. The method of separating hafnium and zirconium, which comprises converting compounds of these elements into double fluorides and separating the salts by fractional crystallization from a solution containing free hydrofluoride acid and an excess of the kation of said salts.

20. The method of separating hafnium and zirconium, which comprises converting compounds of these elements into alkaline double fluorides and separating the salts by fractional crystallization from a solution containing free hydrofluoride acid and an excess of the kation of said salts.

21. The method of separating hafnium and zirconium, which comprises first forming double fluorides of these elements, adding precipitating agents to separate the hafnium and zirconium from contaminating impurities present, and subsequently separating the hafnium from the zirconium by fractional crystallization.

22. The method of separating hafnium and zirconium, comprising the steps of fusing minerals containing compounds of these elements with a bifluoride, adding precipitating agents to the solution of double-fluorides obtained in order to separate the hafnium and zirconium from contaminating impurities present, and subsequently separating the hafnium from the zirconium by fractional crystallization.

23. The method of producing metallic hafnium from a mass containing hafnium and zirconium which comprises starting from a solution of the double fluorides of hafnium and zirconium, separating the salts by fractional crystallization and converting the double-fluoride of hafnium obtained into the metal hafnium.

24. The method of producing metallic hafnium from a mass containing hafnium and zirconium which comprises starting from a solution of the alkaline double fluorides of hafnium or zirconium separating the salts by fractional crystallization and converting the double-fluoride of hafnium obtained into the metal hafnium.

25. The method of producing metallic hafnium from a mass containing hafnium and zirconium which comprises converting the compounds of said elements into double fluorides, separating the salts by fractional crystallization and converting the double-fluoride of hafnium obtained into the metal hafnium.

26. The method of producing metallic hafnium from a mass containing hafnium and zirconium which comprises converting the compounds of said elements into alkaline double fluorides, separating the salts by fractional crystallization and converting the double-fluoride of hafnium obtained into the metal hafnium.

27. The steps in the method of producing metallic hafnium from a mass containing hafnium and zirconium which comprises starting from a solution of the double fluorides of hafnium and zirconium, separating the salts by fractional crystallization, and adding an excess of base to the solution of the double-fluoride of hafnium.

28. The steps in the method of producing metallic hafnium from a mass containing hafnium and zirconium which comprises starting from a solution of the alkaline double fluorides of hafnium or zirconium, separating the salts by fractional crystallization, and adding an excess of base to the solution of the double-fluoride of hafnium.

29. The steps in the method of producing metallic hafnium from a mass containing hafnium and zirconium which comprises converting the compounds of said elements into double fluorides, separating the salts by fractional crystallization, and adding an excess of base to the solution of the double-fluoride of hafnium.

30. The method of producing metallic hafnium from a mass containing hafnium and zirconium which comprises converting the compounds of said elements into alkaline double fluorides, separating the salts by fractional crystallization, adding an excess of base to the solution of the double-fluoride of hafnium, and converting the hydroxide of hafnium obtained into metallic hafnium.

In testimony whereof we affix our signatures, at the city of The Hague, this 12th day of January 1924, at the city of Copenhagen, this 24th day of January 1924.

DIRK COSTER.
GEORG von HEVESY.